UNITED STATES PATENT OFFICE.

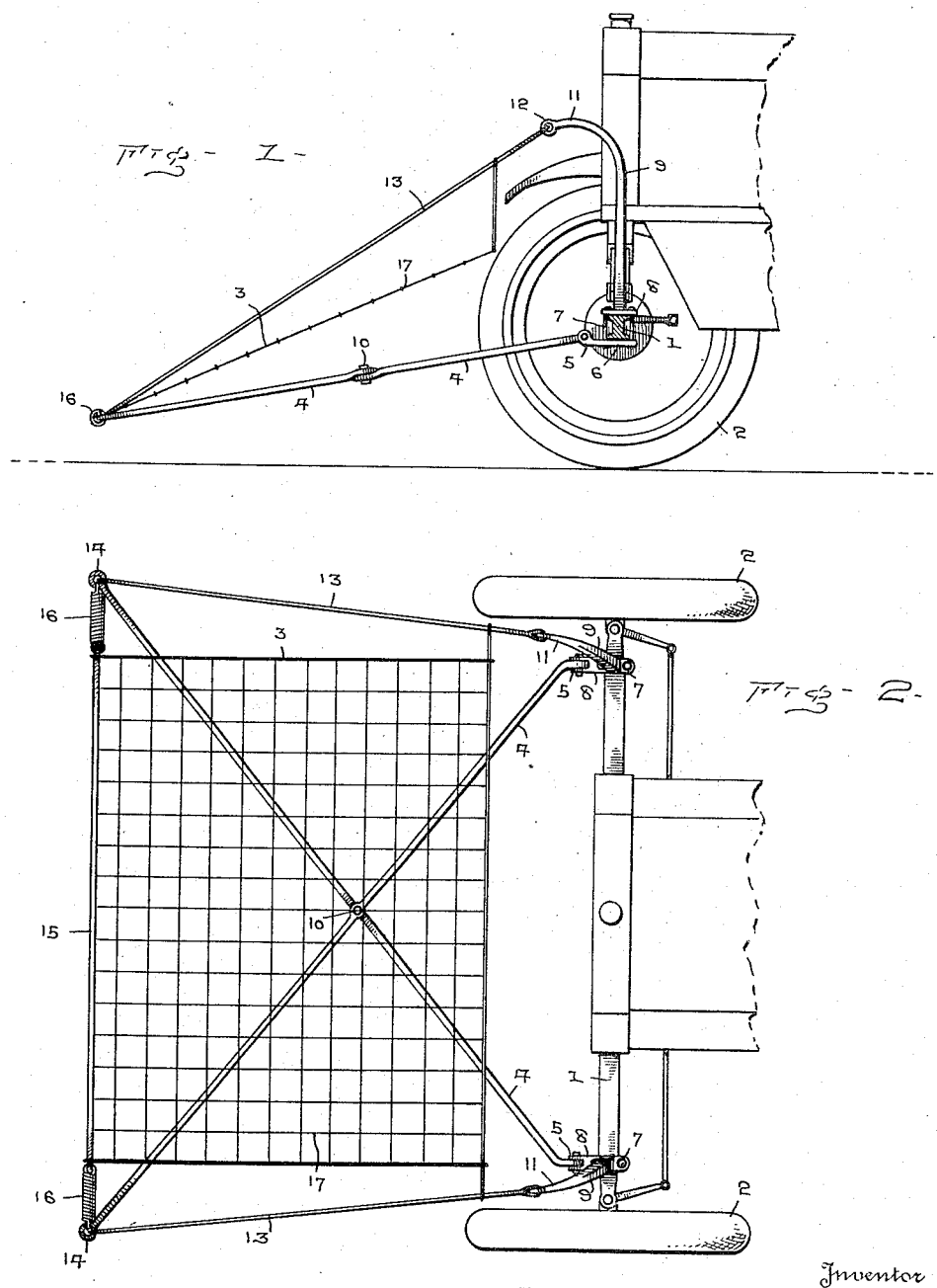

FRANK KOPEL, OF CENTERVILLE, IOWA.

FENDER FOR POWER-PROPELLED VEHICLES.

1,189,833.  Specification of Letters Patent.  Patented July 4, 1916.

Application filed February 11, 1916. Serial No. 77,616.

*To all whom it may concern:*

Be it known that I, FRANK KOPEL, a citizen of the United States, residing at Centerville, in the county of Appanoose and State of Iowa, have invented certain new and useful Improvements in Fenders for Power-Propelled Vehicles; and I do hereby declare the following to be a full, clear, and exact description of the invention, such as will enable others skilled in the art to which it appertains to make and use the same.

My invention relates to new and useful improvements in fenders for power propelled vehicles and more particularly for automobiles, trucks, and the like, and my object is to attach to the forward axle, or other parts of the vehicle, a fender, which when in lowered position will receive and catch the body of a person, or other object, without the body or object coming in contact with the machine.

A further object is to provide a net, or body portion, which will protect the body of a person or animal from injury.

A further object is to provide yielding means at the forward edge of the fender whereby when an object is struck, the force of the impact will be taken up by the springs before being transmitted to the vehicle.

And a further object is to provide means for properly suspending the fender from the vehicle.

Other objects and advantages will be hereinafter set forth and more particularly pointed out in the accompanying specification.

In the accompanying drawings which are made a part of this application, Figure 1 is a side elevation of an automobile showing the axle thereof in section with my improved form of fender attached thereto, and Fig. 2 is a top plan view thereof.

Referring to the drawings in which similar reference numerals designate corresponding parts throughout the several views, 1 indicates the forward axle of an automobile which may be constructed in any preferred manner and 2 the supporting wheels therefor, said wheels being adapted to be swung in different positions to guide the vehicle.

Extending forwardly of the axle 1 is my improved form of fender 3, said fender comprising a pair of bars 4, which may be constructed of rods, sections of pipe, or in any preferred manner, said bars being in crossed relation with each other and having their rear ends pivotally attached between ears 5, of plates 6, said plates being attached to the lower face of the axle 1 by introducing bolts 7 through the base portions 8 of standards 9 and through the plates 6, the bars 4, at their point of crossing, being secured together by a bolt 10 or the like.

The upper ends 11 of the standards 9 are preferably curved forwardly and provided with eyes 12 with which engage cables 13, the opposite ends of said cables engaging eyes 14 at the forward ends of the bars 4, said cables forming the side members of the fender. The front member 15 of the fender is preferably composed of rope, or similar flexible material, the ends of which are attached to coil springs 16, the opposite ends of said springs being attached to the eyes 14, and it will be readily seen that when the fender comes in contact with an object the springs and front member will yield sufficiently to practically absorb the blow of the impact of the object with the fender.

Suspended from the side cables or members 13 of the fender and the front member 15 is a net 17 which forms the body of the fender and is so arranged that it is suspended a sufficient distance above the bars 4 to prevent the object encountered by the fender, descending into engagement with the bars, thus protecting the object from injury. It will likewise be seen that by providing the flexible supports for the net and the coil springs, the body descending into the net will cause the front member 15 and springs to which it is attached to yield sufficiently to break the force of the blow of the body against the net.

This device can be very cheaply constructed and readily attached to the forward axle of the vehicle and by suspending the same in the manner shown, it will in no wise interfere with the swinging action of the wheels 2 when moved to guide the vehicle. It will likewise be seen that in view of the flexibility of the catching net and parts to which it is attached, a body can be thrown with considerable force into the net without receiving material injury. And it will likewise be seen that the fender can be swung upwardly and positioned adjacent the forward end of the vehicle when desired so that the car will not occupy a greater space when being stored than it would without the fender being attached thereto.

Having thus fully described my invention what I claim as new and desire to secure by Letters Patent of the United States, is:—

1. The combination with parts of a vehicle, of standards having base members, plates having ears thereon, means engaging the base members and plates to clamp said plates to parts of the vehicle, crossed bars pivoted to said plates, supporting cables extending from the upper ends of said standards to the outer ends of said bars, springs attached to the forward ends of the bars, a flexible front member connecting said springs, and a flexible net suspended from said cables and front member.

2. The combination with parts of a vehicle, of standards having base members engaging said parts of the vehicle, the upper ends of said standards being curved forwardly, plates positioned on the opposite side of said parts of the vehicle from said base members, bolts adapted to clamp the base members and plates to the parts of the vehicle, bars in crossed relation with each other having their inner ends pivoted to said plates, cables connecting the outer ends of said bars with the curved ends of said standards, springs attached to the outer ends of said bars, a flexible front member connecting said springs, and a net suspended from said cables and front member.

In testimony whereof I have signed my name to this specification in the presence of two subscribing witnesses.

FRANK KOPEL.

Witnesses:
A. C. HENDERSON,
C. A. BAKER.

Copies of this patent may be obtained for five cents each, by addressing the "Commissioner of Patents, Washington, D. C."